United States Patent Office 2,790,436
Patented Apr. 30, 1957

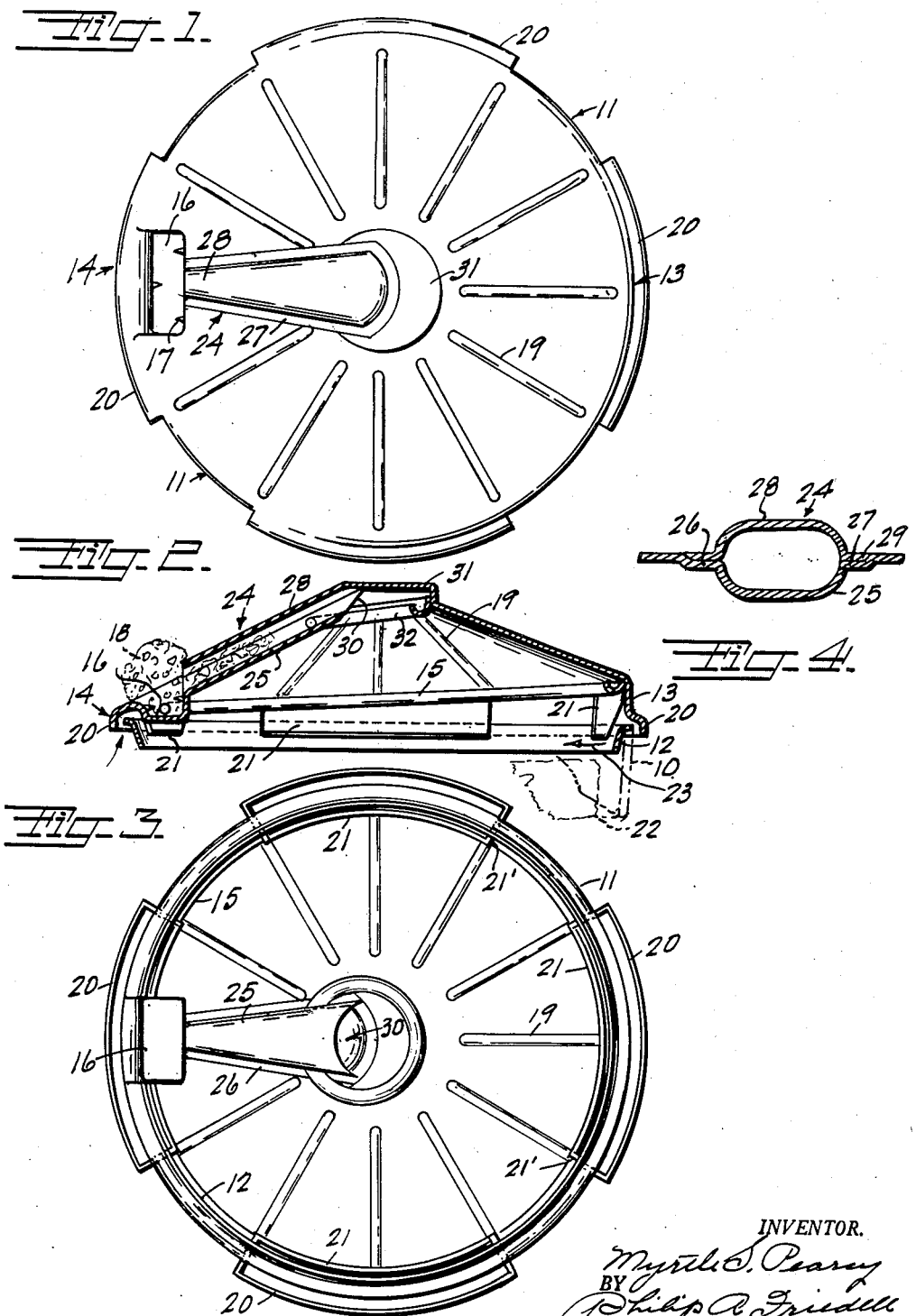

2,790,436

FRYING PAN COVERS

Myrtle S. Pearcy, Sacramento, Calif.

Application April 8, 1954, Serial No. 421,720

5 Claims. (Cl. 126—384)

This invention relates to improvements in frying pan covers and provides a cover which filters the smoke and the steam of fats, oils and other foreign substances to maintain the room in which frying is carried out free of odors and the walls and surroundings unstained and clean.

This cover, while filtering the grease out of the smoke and steam, also partly condenses the steam, prevents spattering of grease during a frying operation, and augments the heat through passage and deflection of heat from the burner passing up about the frying pan, on top of the food being fried.

The objects and advantages of the invention are as follows:

First, to provide a cover for a frying pan which will prevent the spattering of grease, and filter the grease out of the smoke and steam developed during the frying operation.

Second, to provide a cover as outlined of substantially flat conical form and provided with upper and lower circumferential drain troughs discharging into a sponge pocket, and additionally providing a down-take tube from the apex to the sponge pocket, to condense steam and collect the grease carried by the smoke and steam to prevent the coating and soiling of the walls of the room by grease laden smoke and steam.

Third, to provide a cover as outlined with heat diverting and deflecting means for diverting heat surrounding the frying pan from the burner, to the space inside of the cover and frying pan for decreasing the frying time through decrease of moisture content within the space.

In describing the invention reference will be had to the accompanying drawings, in which:

Fig. 1 is a top plan view of the invention.

Fig. 2 is a sectional elevation through the invention.

Fig. 3 is a bottom plan view showing the interior construction of the cover.

Fig. 4 is an enlarged fragmentary view showing the construction of the tubular down-take.

The cover is made to fit within a frying pan 10, being formed inwardly as indicated at 11 with a depending collar 12. The peripheral portion of the cover is made relatively high on one side as indicated at 13 and relatively low on the other side as indicated at 14 to provide a taper from the high to the low side to develop slope for a spattered grease trough 15 which extends circumferentially within the peripheral portion, and the ends of which terminate and open into a sponge pocket 16 which is depressed in the top surface on the lower side as close to the peripheral edge of the cover as possible, and which pocket is provided with suitable retaining means 17 for an absorbent medium such as a sponge 18 therein, for absorbing the grease discharged from the trough, and which absorbent medium is readily removable for replacement or cleaning. Ridges 19 are formed in the cover to aid in draining of the grease to the trough.

The heat collecting and deflecting means for collecting heat surrounding the frying pan from the burners and deflecting the same to the top surface of the food being fried consists of canopies 20 formed outwardly and curved downwardly from the periphery of the cover and which deflect the heat into the frying pan, and which heat is then deflected by the deflectors or baffles 21 which extend only through the angular lengths of the canopies and which are closed at the ends as indicated at 21', with the heat deflected downwardly and over the food 22 as indicated at 23.

The gas or smoke filtering and steam condensing means consists of a down draft and drain tube 24, the cover being depressed to form the lower half of the tube 25 with flange depressions 26 formed along each side to receive the flanges 27 of the other or top half 28 of the tube and which may be soldered or welded in place as indicated at 29. This tube is open at the upper end as indicated at 30 for communication with the highest point in the dome 31 of the cover, and to permit the insertion of glass wool, glass balls, or other condensing material. A dome trough 32 is formed about the inside of the dome and slopes to and communicates with the drain tube 24 for collecting and discharging condensed vapors from the dome, and it will be noted that the drain tube tapers from the upper to the lower end, providing an inlet of relatively large area nad an outlet of relatively small or restricted area, thus providing a relatively extensive upper condensing surface while definitely limiting discharge to the absorbent material principally to products of condensation.

Thus, during the frying operation, any grease that spatters is caught by the inside of the cover and drains to the trough 15 and thence into the sponge pocket where it is absorbed by the sponge 18. Heat traveling upwardly about the frying pan passes through the canopies and is then deflected by the deflectors 21 over the top of the food being fried. Steam in the dome passes into the large inlet end of the drain tube in which it is condensed by the extensive top wall, while that which condenses directly in the dome drains to the dome trough thence to the drain tube, the steam and smoke passing down the drain tube passes through the condensing and collecting material 33, thus maintaining the atmosphere within the frying pan and cover as dry as possible and preventing dripping of the grease and water back onto the food. Any smoke existing during the frying operation passes through the condensing and collecting material and thence to the sponge and atmosphere free of grease, thus maintaining the walls of the room clean.

I claim:

1. A cover for a frying pan and having a peripheral wall relatively high on one side and relatively low on the other side and having a recess formed in the top surface on the said low side adjacent to the peripheral wall, and a grease trough extending about the underside of said cover and sloping from said high side to said low side and terminating in said recess for draining grease to said recess, and means for securing an absorbent medium in said recess for absorbing the grease delivered by said trough, canopies formed outwardly from the peripheral wall of said cover for catching and deflecting hot gases from the burner surrounding the frying pan, into the frying pan, and deflectors within said cover for deflecting the hot gases downwardly and over the food contained in the frying pan.

2. A cover for a frying pan and having a peripheral wall relatively high on one side and relatively low on the other side and having a recess formed in the top surface on the said low side adjacent to the peripheral wall, and a grease trough extending about the underside of said cover and sloping from said high side to said low side and terminating in said recess for draining grease to said recess, and means for securing an absorbent medium in said recess for absorbing the grease delivered by said trough, said cover being substantially conical in form and terminating in a dome, a tubular member having its upper end of relatively large cross-sectional area for filling with condensing media and extending up into said dome and converging downwardly to a relatively small cross-sectional area for retention of said media and for restricting passage of gases, and discharging into said recess and open at both ends for condensation and absorption of smoke and steam.

3. A cover for a frying pan and having a peripheral wall relatively high on one side and relatively low on the other side and having a recess formed in the top surface on the said low side adjacent to the peripheral wall, and a grease trough extending about the underside of said cover and sloping from said high side to said low side and terminating in said recess for draining grease to said recess, and means for securing an absorbent medium in said recess for absorbing the grease delivered by said trough, said cover being substantially conical in form and terminating in a dome, a tapered recess converging downwardly from said dome to said first mentioned recess and a cover member for said tapered recess and sealed to the cover to form a condensing media holder and drain for transfer of smoke and steam to said first mentioned recess, and a trough formed about the inside of said dome and having terminal ends in communication with said tapered recess for collection and discharge of condensed gases to said first mentioned recess.

4. A cover for a frying pan and having a peripheral wall relatively high on one side and relatively low on the other side and having a recess formed in the top surface on the said low side adjacent to the peripheral wall, and a grease trough extending about the underside of said cover and sloping from said high side to said low side and terminating in said recess for draining grease to said recess, and means for securing an absorbent medium in said recess for absorbing the grease delivered by said trough, canopies formed outwardly from the peripheral wall of said cover for catching and deflecting hot gases surrounding the frying pan into the frying pan, deflectors within said cover for deflecting and directing the hot gases downwardly and over the food contained in the frying pan, said cover being substantially conical in form and terminating in a dome, a tubular member extending from said dome to said recess and open at both ends to transfer smoke and steam from said dome to said recess, and a trough formed about the inside of said dome at the lower end thereof and communicating with said tubular member for collection and discharge of condensed steam to said recess.

5. A cover for a frying pan and having a peripheral wall relatively high on one side and relatively low on the other side and having a receptacle open to atmosphere and formed downwardly into the top surface of said cover on the said low side adjacent to the peripheral wall and having end walls and an absorbent medium in said receptacle, and a grease trough extending circumferentially about the underside of said cover adjacent the periphery thereof and sloping from said high side to said low side and having terminal ends opening through the respective side walls of said receptacle for draining grease into said receptacle for absorbtion by said absorbent medium.

References Cited in the file of this patent

UNITED STATES PATENTS

| | | |
|---|---|---|
| 488,664 | Reuber et al. | Dec. 27, 1892 |
| 509,282 | Beck | Nov. 21, 1893 |
| 539,861 | Epp | May 28, 1895 |
| 626,780 | Baker | June 13, 1899 |
| 1,787,172 | Rohrmann et al. | Dec. 30, 1930 |

FOREIGN PATENTS

| | | |
|---|---|---|
| 8,497 | Great Britain | of 1900 |